United States Patent
Passoni

(10) Patent No.: US 7,594,310 B2
(45) Date of Patent: Sep. 29, 2009

(54) METHOD AND DEVICE FOR PRODUCING A MECHANICAL PART, IN PARTICULAR A BEARING RING AND A PART PRODUCED BY SAID METHODS

(76) Inventor: Gianfranco Passoni, Le Boretton, CH-1473 Chatillon (CH)

( * ) Notice: Subject to any disclaimer, the term of this patent is extended or adjusted under 35 U.S.C. 154(b) by 252 days.

(21) Appl. No.: 11/661,797

(22) PCT Filed: Sep. 2, 2005

(86) PCT No.: PCT/CH2005/000521

§ 371 (c)(1),
(2), (4) Date: Mar. 1, 2007

(87) PCT Pub. No.: WO2006/024191

PCT Pub. Date: Mar. 9, 2006

(65) Prior Publication Data

US 2008/0236707 A1   Oct. 2, 2008

(30) Foreign Application Priority Data

Sep. 3, 2004   (FR) .................................. 04 09321

(51) Int. Cl.
*B23P 23/00*   (2006.01)
*B22D 13/04*   (2006.01)
*B22D 13/10*   (2006.01)

(52) U.S. Cl. ................. 29/33 C; 29/898.066; 29/527.6; 29/898.12; 29/DIG. 6; 164/335; 164/286; 164/297; 164/80; 164/133

(58) Field of Classification Search ................. 29/33 C, 29/898.066, 898.054, 898.048, 898.049, 29/898.042, 527.5, 527.6, 898.12, 33 D, 33 T, 29/DIG. 6; 164/118, 133, 335, 114, 286, 164/288, 292, 298, 297, 80; 148/539; 266/204, 266/236; 222/591, 592, 593
See application file for complete search history.

(56) References Cited

U.S. PATENT DOCUMENTS

| | | | | | |
|---|---|---|---|---|---|
| 1,833,347 | A | * | 11/1931 | Avis ............................ | 164/495 |
| 1,844,701 | A | * | 2/1932 | Tama .......................... | 164/493 |
| 1,920,022 | A | * | 7/1933 | Six ........................... | 29/898.12 |
| 2,557,971 | A | * | 6/1951 | Jacklin, Jr. .................... | 164/493 |
| 2,697,043 | A | * | 12/1954 | Wade ......................... | 148/421 |
| 3,451,467 | A |   | 6/1969 | Frankeny et al. | |

(Continued)

FOREIGN PATENT DOCUMENTS

EP   28653 A1 *   5/1981

(Continued)

*Primary Examiner*—Erica E Cadugan
(74) *Attorney, Agent, or Firm*—Davis & Bujold, P.L.L.C.

(57) ABSTRACT

A device and method for producing, by molding, a circular-shaped mechanical part made of a metal alloy. The device has a rotatable hollow mold for receiving a predetermined quantity of the metal alloy. The predetermined quantity of the metal alloy is defined by at least one segment of a metal alloy rod. An inductive heating device melts the metal alloy to a melting point. A blank of the mechanical part being formed by centrifuging the melted metal alloy. Cooling the blank in the hollow mold to a second temperature which corresponds to a desired malleability. Processing the blank with a shaping tool to obtain a desired internal profile. To harden and form the circular-shaped mechanical part, the blank is further cooled to a tempering temperature.

11 Claims, 4 Drawing Sheets

U.S. PATENT DOCUMENTS

| | | | |
|---|---|---|---|
| 3,720,987 A | | 3/1973 | Dubost |
| 3,927,450 A | * | 12/1975 | Sommer et al. ........ 29/898.066 |
| 4,030,944 A | * | 6/1977 | Sommer et al. ............. 148/539 |
| 4,117,878 A | * | 10/1978 | Najmowicz et al. ......... 164/292 |
| 4,261,412 A | * | 4/1981 | Soykan et al. ............... 164/495 |
| 5,101,547 A | | 4/1992 | Tanaka et al. |
| 5,799,386 A | * | 9/1998 | Ingersoll et al. ............ 29/527.5 |

FOREIGN PATENT DOCUMENTS

| | | |
|---|---|---|
| FR | 2 516 825 | 5/1983 |
| FR | 2874979 A1 * | 3/2006 |
| GB | 852359 | 10/1960 |
| JP | 59-078764 A * | 5/1984 |
| JP | 03-008546 A * | 1/1991 |
| JP | 2004098090 | 4/2004 |

* cited by examiner

METHOD AND DEVICE FOR PRODUCING A MECHANICAL PART, IN PARTICULAR A BEARING RING AND A PART PRODUCED BY SAID METHODS

This is a national stage completion of PCT/CH2005/000521 filed Sep. 2, 2005 which claims priority from French Application Serial No. 04/09321 filed Sep. 3, 2004.

TECHNICAL FIELD

This invention concerns a method for producing a circular-shaped mechanical part, in particular an annular-shaped part such as a bearing race made of a metal alloy that can undergo at least a hardening heat treatment, in which a blank of this mechanical part is produced through centrifugation in a hollow rotating mold by means of a predetermined volume of this metal alloy brought to a melting temperature $T_1$ and in which this blank is cooled to a temperature $T_2$ lower than this melting temperature $T_1$, at which this blank has a malleable consistency.

It also concerns a device for implementing this method to produce a circular-shaped mechanical part, in particular an annular-shaped part such as a bearing race made of a metal alloy that can undergo at least a heat hardening treatment comprising a hollow rotating mold positioned to receive the pre-determined volume of this metal alloy, heating components to heat this metal alloy to the melting temperature $T_1$ and drive mechanisms to make this hollow mold rotate and produce a blank of the mechanical part via centrifugation.

Finally, it includes a mechanical part produced using this method and this device.

PRIOR ART

Circular-shaped mechanical parts and in particular annular-shaped parts such as ball or needle bearing races, for example, are generally produced using known cutting methods that involve complex and costly machining of the part from an appropriate metal bar such as chromium steel. By way of example, for a ball bearing race, the machining phases include positioning the metal bar on the mandrel of a lathe, internal piercing, external shaping using a plunge chisel, machining the interior race using a tool that penetrates into the central cavity and that can be moved laterally, machining the grooves for housing the dust caps on either side of the race, cutting the part, washing it and heating treating or tempering it.

The machining operations all produce shavings since they consist in removing material from the full metal bar with a circular section, which is the prime material used to manufacture the part. Since the alloys used are expensive, the production of shavings generates a non-negligible loss, since the amount of shavings produced during machining often weigh more than the part itself. Additionally, for each part diameter, it is necessary to have a raw metal bar with an equal diameter, which means considerable securing and management of stock for various metal alloy bars whose base price is high. Finally, each part corresponds to a range of drilling, milling and other very important tools that must be maintained to guarantee quality production. In particular, cutting machines are expensive, and the investment is relatively large for a manufacturer.

All these disadvantages plus the fact that some extra hard steels do not lend themselves to this type of traditional machining and are therefore not used very much in current industry practices for economic reasons mean that the known methods are difficult to manage in an economic process where productivity has become a major asset.

Relatively satisfactory tests have been conducted, but they have not resulted in satisfactory results with respect to both quality and productivity.

Publication GB 852 359 describes a centrifuge casting method for steel rings in which a pre-determined quantity of molten metal is taken from a tank of melting metal to be poured into a casting crucible. Collecting a pre-determined quantity of molten metal is particularly tricky to do with a pouring-basin equipped with a distribution nozzle and a mechanical stopper.

American patent U.S. Pat. No. 3,927,450 also describes a method for centrifugally casting hollow metal alloy ingots. These ingots are then mechanically machined and cut to form the desired circular-shaped mechanical parts.

French patent FR 2,516,825 also describes a centrifugal casting device. As in the previous documents, the molten alloy is taken from a tank containing the melting material, and the required quantity is removed using an intermediate recipient. This type of supply device is not very precise and is complex and expensive.

American patent U.S. Pat. No. 3,720,987 describes a method for manufacturing rings, particularly bearing races using carbon steel metal alloys, via centrifugation. This method intends to cause a migration of the steel particles toward the exterior and of the carbon particles toward the interior of the cast part.

American patent U.S. Pat. No. 5,101,547 describes a centrifugal casting method in which the melting material is taken from a molten bath of raw material.

None of these methods are precise and reliable and none allow the rapid, economical and reliable production of precision parts. Bearing races are parts of great expenditure that must be manufactured with tolerances of around $1/1000^{th}$ of a millimeter.

DESCRIPTION OF THE INVENTION

The objective of the invention is to eliminate all of these disadvantages by proposing to replace the standard machining methods that remove metal alloy shards with a simple and economic forming technique allowing the use of any metal alloy, even extra hard alloys, from a reduced stock of raw material and the combination, in certain cases, of this shaping with at least one thermal treatment phase for the part.

This goal is achieved by the method as defined in the introduction and characterized in that the volume of metal alloy to be melted is determined based on a metal alloy bar inserted into a vertical induction oven open at its lower end above the hollow mold. This predetermined volume of metal alloy is brought to the melting temperature $T_1$. The interior shape of this mechanical part is formed using machining components brought into contact with its interior face when this blank has reached temperature $T_2$. This part is extracted from the hollow mold and is brought to a tempering temperature $T_3$ and in that it is cooled in a predetermined manner.

According to an advantageous embodiment, the metal alloy bar is pre-notched circularly in order to define bar segments each corresponding to the predetermined volume of raw material required to produce the mechanical part or to a whole sub-multiple of this volume.

According to a first variant, this predetermined quantity of metal alloy can be introduced into the mold in the form of at least one drop formed by at least one bar segment melted at temperature $T_1$ in the vertical heating oven. This drop is detached by gravity from the metal alloy bar inserted inside the vertical heating oven.

According to a second variant, this predetermined quantity of metal alloy can be introduced into the hollow mold in the form of at least one bar segment. This segment is detached from the bar by heating the bar in the areas where it is pre-scored. This bar segments is then brought to the melting temperature $T_1$ by heating components at least partially surrounding this hollow mold.

This objective is also achieved by the device for implementing this method as defined in the introduction and characterized in that it comprises:

means for determining the volume of metal alloy to be melted from a metal alloy bar;

inducting heating mechanisms to melt this pre-determined volume of metal alloy and bring it to temperature $T_1$ in the hollow mold;

means for cooling this blank obtained by centrifugation of the molten alloy in the hollow mold and bringing it to temperature $T_2$, lower than melting temperature $T_1$, at which this blank has a malleable consistency;

machining mechanisms for forming the interior shape of this mechanical part;

a temperature regulation device to bring the mechanical part obtained from this blank to a tempering temperature $T_3$; and means for tempering this mechanical part (28) after it is extracted from the hollow mold.

Advantageously, the means for determining the volume of metal alloy to be melted consist of circular preliminary notches made on the bar in order to define bar segments each corresponding either to the volume of raw material required to produce the mechanical part or to a whole sub-multiple of this volume.

In a first embodiment variant, the induction heating components may comprise a vertical induction oven open at its lower end above the hollow mold into which the pre-notched bar of metal alloy is inserted.

In a second embodiment variant, the induction heating mechanisms may comprise a vertical induction oven into which the pre-notched bar of metal alloy is inserted and at least one induction coil at least partially surrounding the hollow mold. The heating temperature in this induction oven being, in this case, determined in order to melt the bar only in the pre-notched areas and to thus allow detachment of the segments necessary to obtain the predetermined volume of metal alloy. These segments then being melted in the mold and brought to the melting temperature $T_1$ by the induction coil.

Preferably, the machining mechanisms comprise a rotating profiled shaping tool combined with drive mechanisms to cause it to rotate and means for axial and lateral movement to bring it up against the interior surface of the blank in order to form the interior shape of this mechanical part.

The hollow mold may be combined with a mask that forms a casting wall for the mechanical part.

Advantageously, the means for tempering the mechanical part include at least one tempering bath.

In all the variants, the hollow mold comprises a crucible designed to contain the predetermined volume of metal alloy and a casting cavity that communicates with this crucible.

In one embodiment variant, the hollow mold may consist of at least two radially mobile segments positioned to allow an opening of this mold, in order to extract the cast part.

Depending on the form of embodiment, the means for cooling the blank may be positioned to cool the exterior walls of the mold and/or the mask.

SUMMARY DESCRIPTION OF THE DRAWINGS

This invention and its advantages will be better understood by reading the detailed description of a form of implementation of the method of the invention and its variants in reference to the appended drawings given by way of non-limiting example, wherein.

METHOD(S) FOR PRODUCING THE INVENTION

Figure 1A:
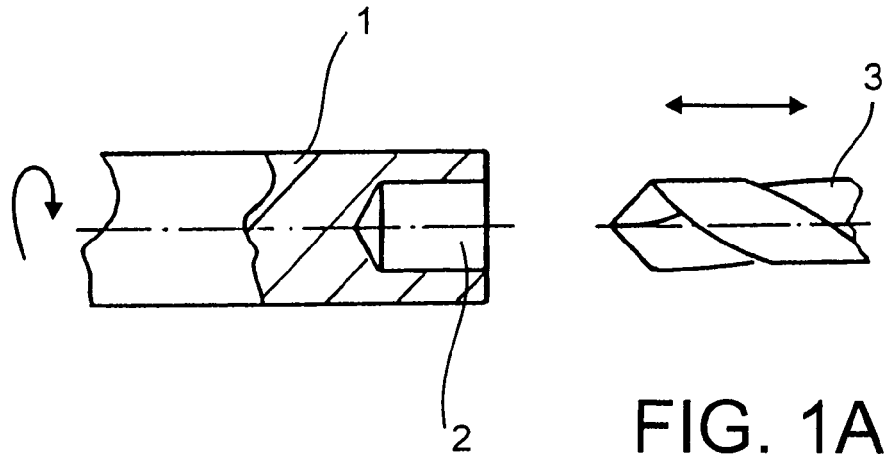
FIG. 1A is a schematic representation of a manufacturing phase of a traditional method, involving cutting, to produce a mechanical part in the form of a bearing race, for example.

In reference to FIG. 1A, the first phase of the manufacturing process for a mechanical part such as a bearing race using standard bar turning consists, for example, of mounting a bar 1 made of an appropriate alloy on the mandrel of a lathe (not shown) and making a central bore 2 using a drill 3.

Figure 1B:
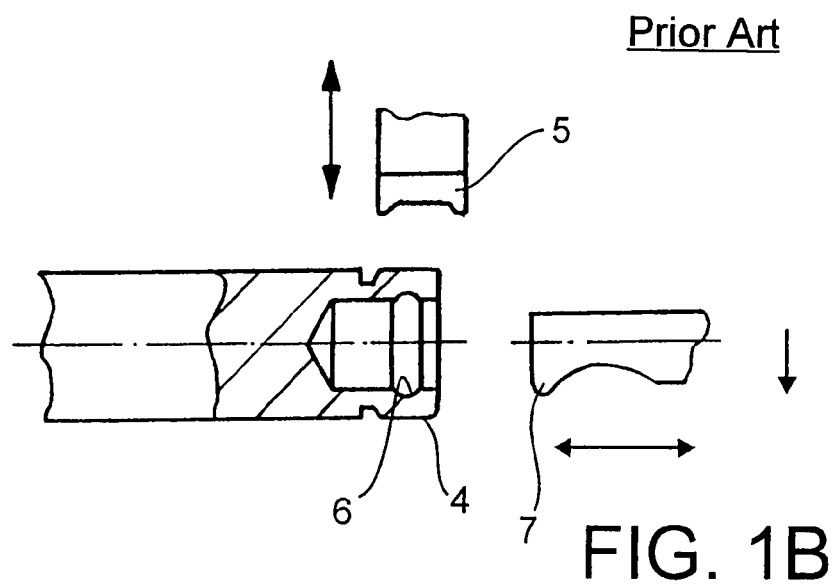
FIG. 1B is a schematic representation of another manufacturing phase of the traditional method, involving cutting, to produce the mechanical part in the form of a bearing race, for example.

FIG. 1B shows two subsequent phases that may be performed simultaneously and consist, on the one hand, of machining the exterior contour 4 of the future part using a plunging tool 5 and, on the other, machining the interior shape of the future part, the race 6, for example, using a shaping tool 7 that moves axially and laterally.

Figure 1C:
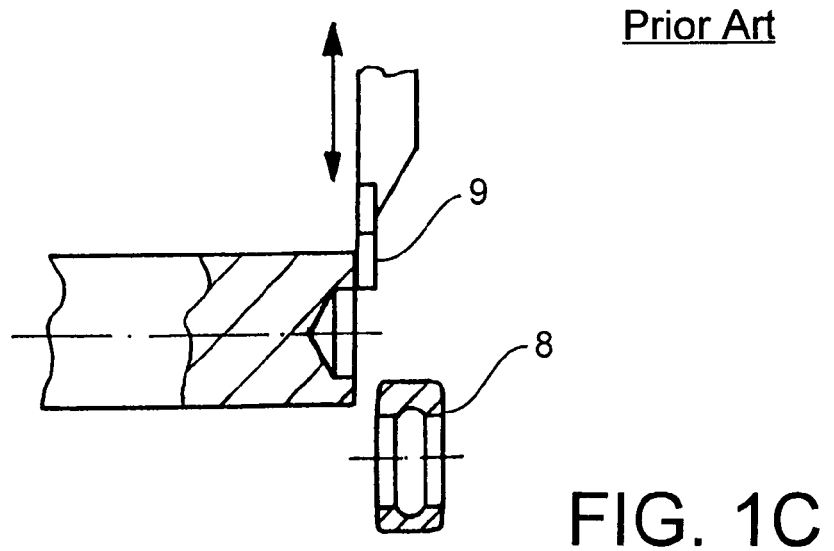
FIG. 1C is a schematic representation of yet another manufacturing phase of the traditional method, involving cutting, to produce the mechanical part in the form of a bearing race, for example.

FIG. 1C illustrates the cutting phase of the machined mechanical part 8 using a plunging cutting tool 9 that detaches the part from the metal bar 1 to allow the start of a new production cycle.

These operations are performed automatically at a rapid rhythm on digital control machines. They generate a large quantity of metal shards and the machining tools must be sharpened regularly and their position must be adjusted to offset their wear.

The method according to the invention makes it possible to do away with all the constraints tied to this manufacturing process by further improving the known method of centrifugally casting parts. The dimensions of the parts obtained using the known method cannot be guaranteed, for measurement of the parts to be cast is not very reliable. In the method of the invention, this disadvantage is eliminated by the fact that the volume of metal alloy to be melted is determined using a metal bar inserted inside a vertical induction oven, this bar being divided into equal, pre-cut sections which will make it possible to obtain a predetermined volume of metal alloy that is always identical. This predetermined volume of metal alloy is then brought to the alloy's melting temperature to form a blank via centrifugation in a rotating mold. While the blank is still malleable, the interior shape of the desired mechanical part is formed using a machining tool such as a rotating profiled shaping tool brought into contact with its interior surface and after the part is extracted from the mold, it is immersed in a tempering bath.

This method may be used on a device illustrated in FIGS. 2A to 2G. This device 10 comprises a hollow mold that rotates around its axis 12 and that comprises a crucible designed to receive a metal alloy in molten state, for example, as well as a casting cavity 14. This hollow mold 11 is topped by a mask 15 that is part of this mold and that comprises a central opening 16. The hollow mold 11 is mounted on a support 17 that is housed in a housing 18 containing means for making the support 17 and the hollow mold 11 rotate.

Above this equipment there is a feed device for the raw material used to produce the mechanical part, in this case a metal alloy that is presented, for example, in the form of a bar 20 that is formed of segments 21 connected to one another by peripheral grooves 22. In practice, a milling device (not shown) machines the peripheral grooves 22 in a predetermined manner automatically controlled to define the segments 21. This bar 20 is inserted into a vertical induction oven 23 so that a quantity of raw material is melted and falls into the crucible 13 of the rotating hollow mold 11.

For this purpose, the vertical induction oven 23 comprises induction coils 24 whose axes are vertical and correspond to the axis of the central channel 25, which corresponds more or less to the axis of the hollow mold. The induction coils 24 are arranged so that the segments 21 of the bar 20 that are automatically moved in the direction of the arrows are first pre-heated, then melted. Each segment 21 preferably has an equal volume or a volume that corresponds to a whole sub-multiple of the volume of raw material necessary to produce the mechanical part.

Figure 2C:
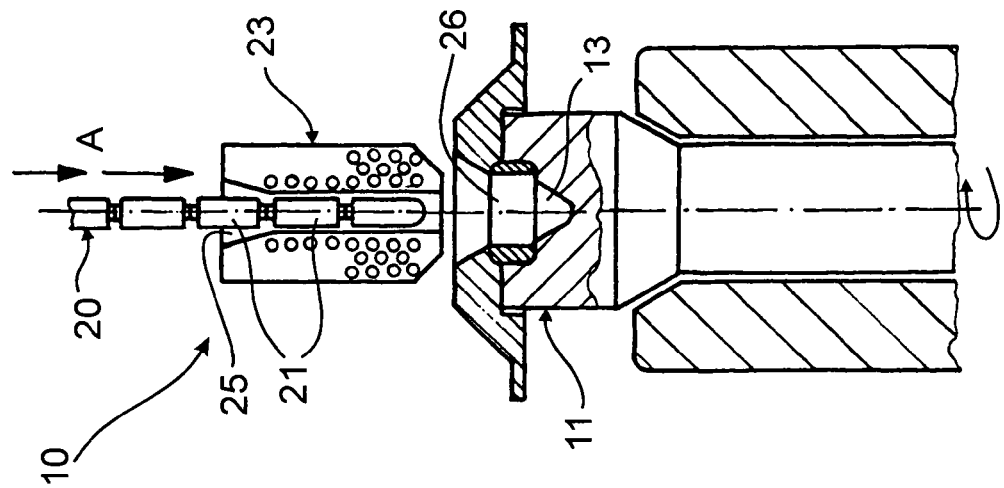
FIG. 2C is a schematic representation of the inventive device and yet another operational phase of the first embodiment of the inventive method for producing the mechanical part shaped like a bearing race.

The functioning of this device is explained below in reference to the Figs., which represent the different stages of the process. FIG. 2A shows the hollow mold 11 covered by the mask 15 and positioned under the vertical induction oven 23 fed with raw material in the form of a metal alloy bar 20 divided into segments 21 that are successively pre-heated then melted in the oven.

Figure 2B:
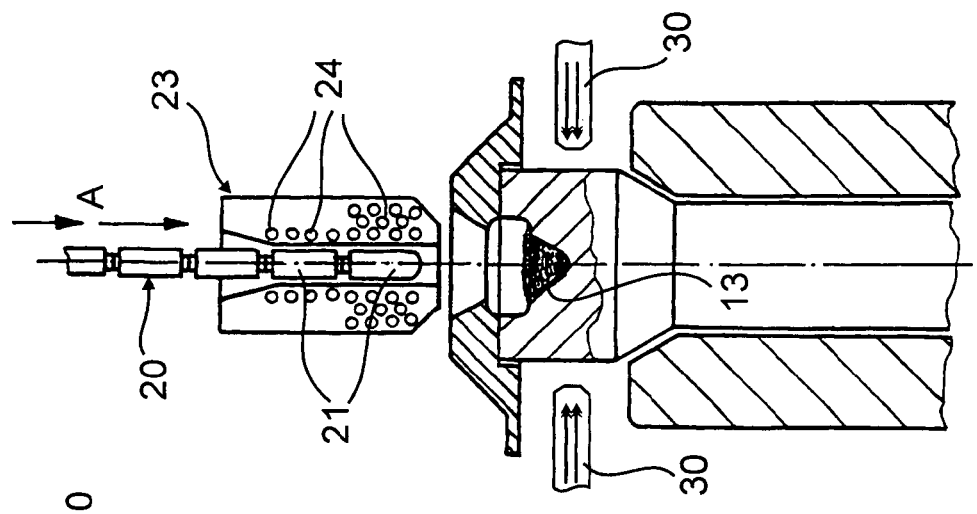
FIG. 2B is a schematic representation of the inventive device and another operational phase of the first embodiment of the inventive method for producing the mechanical part shaped like a bearing race.
Figure 2A:
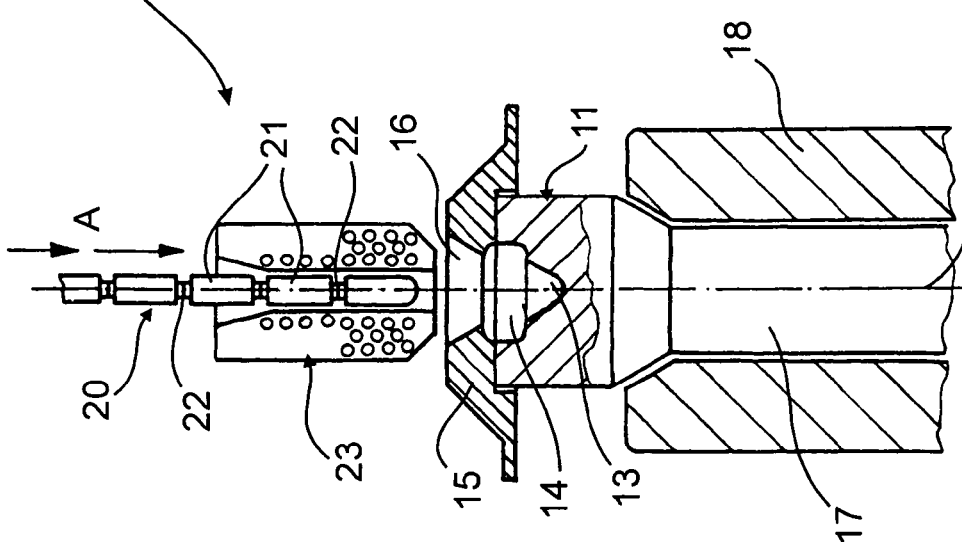
FIG. 2A is a schematic representation of an inventive device and a operational phase of a first embodiment of an inventive method for producing a mechanical part shaped like a bearing race.

FIG. 2B shows the next phase during which the gravity has caused the volume of melted raw material corresponding to at least one segment 21 of the bar 20 to fall into the crucible 13. In this phase, the hollow mold may be stationary, or rotating at slow speed.

FIG. 2C shows the centrifugation phase during which the hollow mold is rotated at high speed so that the melted material in the crucible is sprayed into the casting cavity 14 via centrifugation to assume a shape that corresponds to a blank 26 of the mechanical part to be produced. The exterior shape of this finished part corresponds exactly to the peripheral shape of the casting cavity 14. It will be noted that the mask 15 is still in place, since it forms one of the casting walls of the casting cavity 14. It will also be noted that the bar 20 is advanced so that at least one of its segments 21 is in the central channel 25 of the vertical induction oven 23 for the next casting.

Figure 2D:
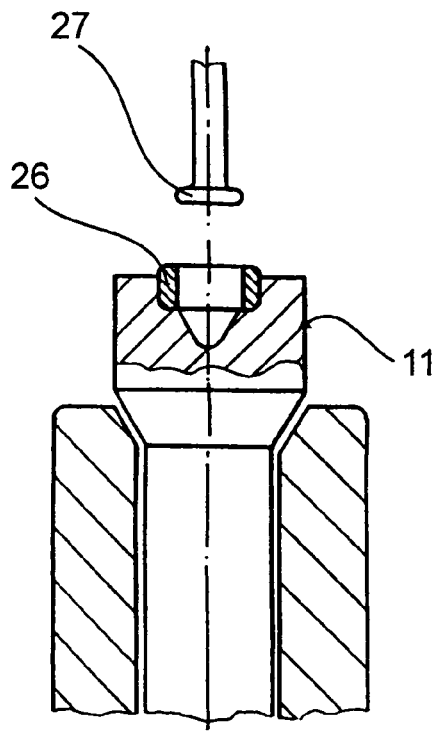
FIG. 2D is a schematic representation of the inventive device and a further operational phase of the first embodiment of the inventive method for producing the mechanical part shaped like a bearing race.

FIG. 2D shows a wait phase during which the blank 26 is cooled by cooling components 30, for example ventilation ducts directed toward the exterior walls of the of the mold 11 and/or the mask 15. The induction oven raised the temperature of the raw material to a value $T_1$, which corresponds to the material's melting temperature. This temperature is lowered by cooling mechanisms 30 during this phase of the process to a value $T_2$ at which the metal alloy is malleable enough to be shaped by the appropriate machining mechanisms. These machining mechanisms are represented in the form of a shaping tool 27 that may rotate around its axis. It will be noted that the mask 15 has been withdrawn during this step.

Figure 2E:
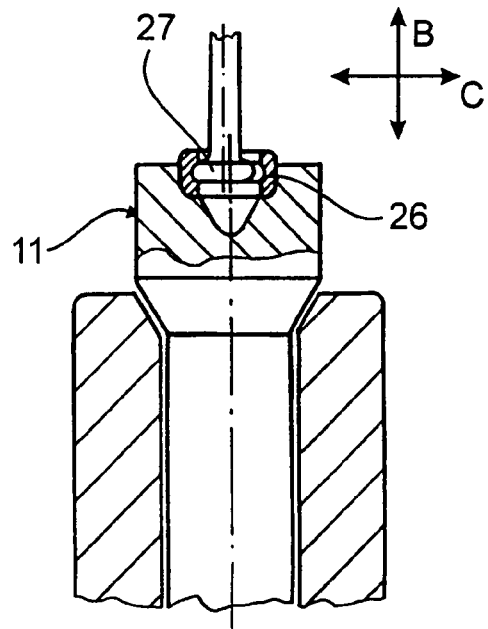
FIG. 2E is a schematic representation of the inventive device and another operational phase of the first embodiment of the inventive method for producing the mechanical part shaped like a bearing race.

FIG. 2E represents the shaping phase during which the interior profile of the mechanical part is produced by the shaping tool 27 that comes into contact with the blank 26 in malleable state, this shaping tool being lowered and inserted axially into the cavity of the hollow mold in the direction of arrow B, then moved laterally in the direction of arrow C.

Figure 2F:
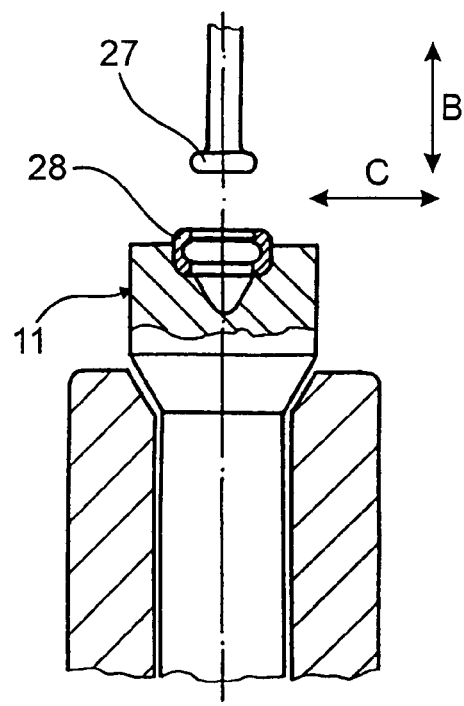
FIG. 2F is a schematic representation of the inventive device and still operational phase of the first embodiment of the inventive method for producing the mechanical part shaped like a bearing race.

FIG. 2F illustrates the phase during which the shaping tool 27 is removed from the hollow mold 11 after shaping the mechanical part 28. This part is then extracted from the hollow mold 11 by known gripping mechanisms that are not described here.

Figure 2G:
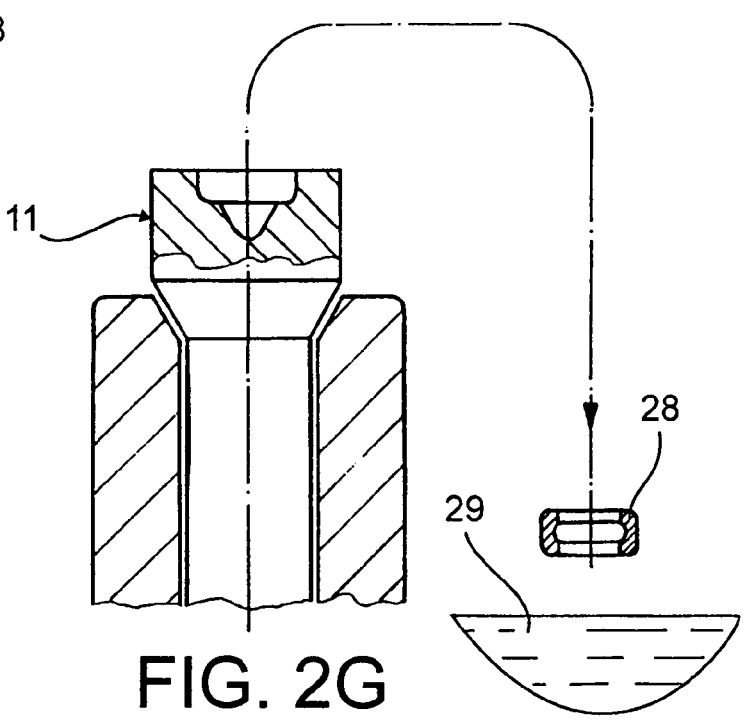
FIG. 2G is a schematic representation of the inventive device and an additional operational phase of the first embodiment of the inventive method for producing the mechanical part shaped like a bearing race.

FIG. 2G is a schematic illustration of the phase during which the cast part 28 extracted from the hollow mold 11 is transferred to a tempering bath 29 when, by means of a temperature regulation device (not shown) it reaches the temperature $T_3$ allowing this tempering. Another production cycle can be started immediately after the part 28 is removed from the mold 11. If necessary, the mold may be changed in order to produce another part.

These different phases of the process may be carried out in a controlled atmosphere to prevent oxidation or corrosion depending on the metal alloy used.

Figure 3B:
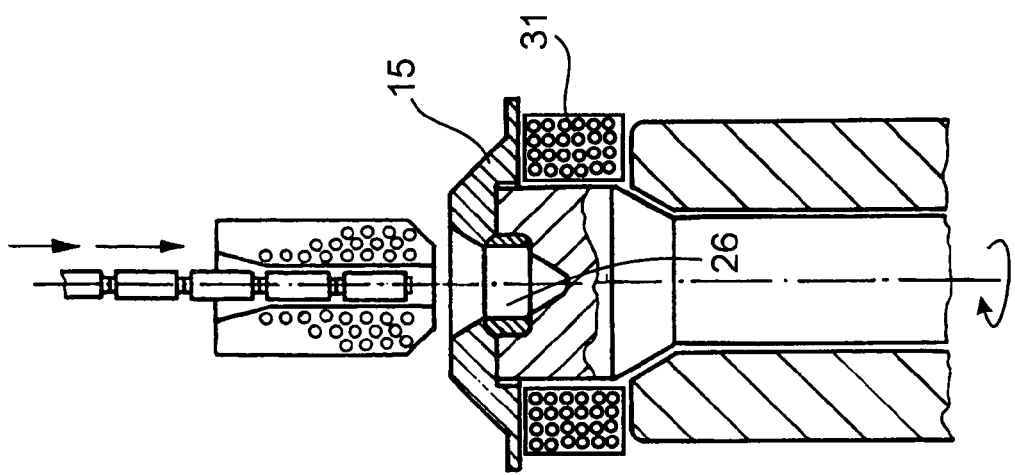
FIG. 3B is a schematic representation of the second embodiment of the inventive device and another operational phase of the second embodiment of the inventive method for producing the mechanical part in the shape of a bearing race.
Figure 3A:
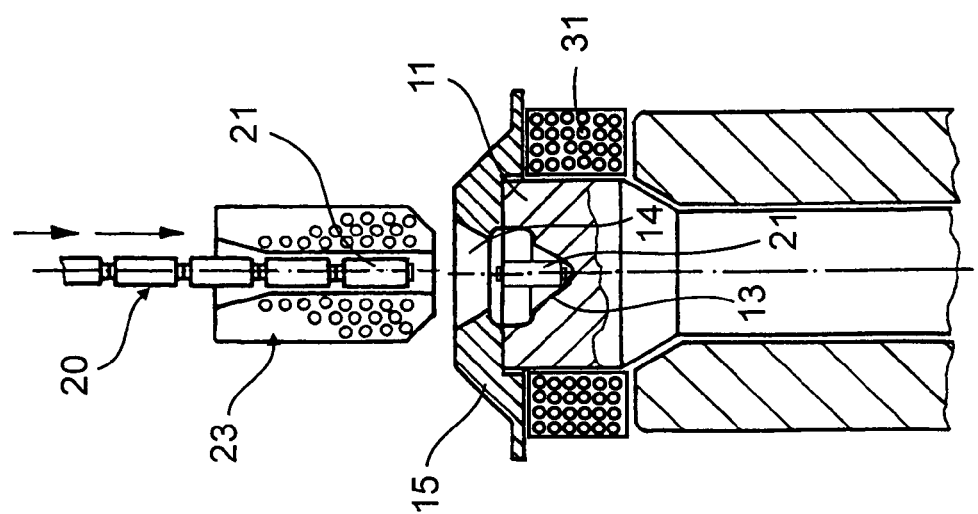
FIG. 3A is a schematic representation of a second embodiment of the inventive device and an operational phase of a second embodiment of the inventive method for producing a mechanical part in the shape of a bearing race.

In a second embodiment of the device as illustrated in FIGS. 3A and 3B, the raw material, namely the metal alloy, is melted directly in the crucible 13 of the hollow mold 11 and the heating components in the form of induction coils 31 are positioned around the hollow mold 11. In this variant, the vertical oven 23 is used at a lower temperature than in the first embodiment so that only the area separating the two consecutive segments 21 can melt in order to detach a segment 21 of the bar 20. Depending on the predetermined volume necessary to produce the part, this or these segments fall into the mold 11 where they are brought to the melting temperature $T_1$ by the heating components surrounding the mold.

The other components of the device are more or less the same and, when the metal alloy is melted, centrifugation by rotation of the hollow mold around its axis produces a blank 26 whose treatment is the same as that described above to produce the final part.

In the two variants of the device according to the invention described previously, the hollow mold is topped by a mask 15. The part can be removed from the mold after this mask is removed.

Figure 4:
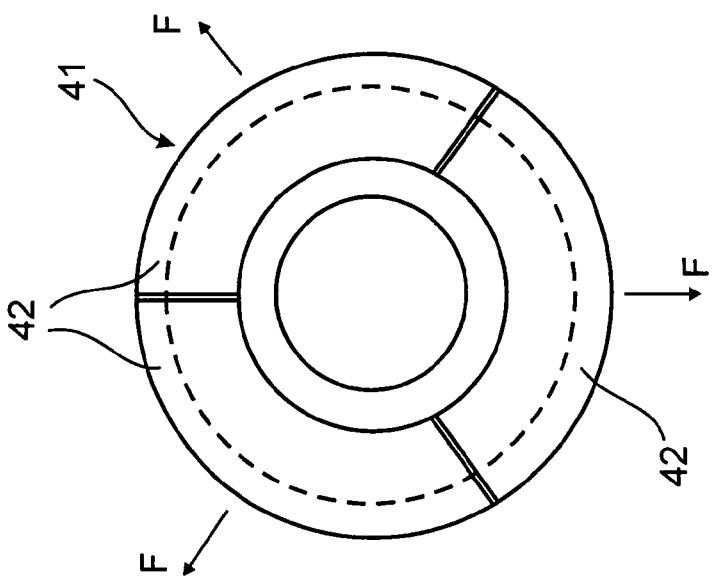
FIG. 4 is a top view of a particular embodiment of a hollow mold used in the device according to the invention.

FIG. 4 shows a variant making it possible to obtain mechanical parts comprising a shape on their exterior contour. In this case, removal of the finished part requires opening the hollow mold and the hollow mold 41 contains no mask and consists of at least two segments. These segments 42 of which there are three in the example shown, move radially in the direction of the arrows F to allow the automatic extraction of the part by means of a gripping robot (not shown)

The preferred embodiments described may undergo different modifications and may be incorporated in a carrousel equipped with different workstations. It is also possible to use an alloy in the form of divided particles, for example grains or granules, contained in a feed regulator. In this case, the quantity of particles necessary can be measured by weighing or by volume measurement, so that the volume of particles corresponds to the volume of the part to be produced. The particles of raw material are poured cold into the crucible of a hollow mold equipped with heating components as described in reference to the second form of embodiment.

The invention claimed is:

1. A production device for producing a circular-shaped mechanical part made of a metal alloy capable of undergoing at least one thermal hardening treatment, said device comprising a rotating hollow mold (11, 41) positioned to receive a predetermined volume of the metal alloy, induction heating components to bring at least part of the metal alloy to a melting temperature ($T_1$) and drive mechanisms to cause the hollow mold to rotate and produce a blank (26) of the mechanical part through centrifugation, a means for determining the predetermined volume of the metal alloy to be melted from a metal alloy bar (20), wherein the metal alloy bar is fed by a feed device to a position in the induction heating components such that at least the means for determining the predetermined volume of the metal alloy is brought to the melting temperature ($T_1$) therein, and the predetermined volume falls into the hollow mold;

a means (30) for cooling the blank (26) which was obtained through centrifugation of the molten alloy metal in the hollow mold and for bringing the predetermined volume of the metal alloy to a temperature second ($T_2$), lower than the melting temperature ($T_1$), at which the blank (26) has a malleable consistency;

a machining mechanism to form an interior shape of the mechanical part (28);

a temperature regulation device to bring the mechanical part (28) obtained from this blank to a tempering temperature ($T_3$); and a means for tempering the mechanical part (28) after the mechanical part (28) is extracted from the hollow mold.

2. The device according to claim 1, wherein the means for determining the predetermined volume of the metal alloy to be melted comprises preliminary circular notches made on the bar (20) to define bar segments (21), the notches corresponding to one of the predetermined volume of the metal alloy required to produce the mechanical part (28) and to a whole sub-multiple of the predetermined volume of the metal alloy.

3. The device according to claim 1, wherein the induction heating components comprise a vertical induction oven (23) open at a lower end above the hollow mold, into which oven a prenotched bar of the metal alloy is inserted.

4. The device according to claim 1, wherein the induction heating components comprise a vertical induction oven (23) into which a prenotched bar (20) of the metal alloy is inserted, and the device further comprising at least one induction coil (31) at least partially surrounding the hollow mold (11), the melting temperature ($T_1$) in the induction oven (23) being defined to melt the pre-notched bar (20) only in pre-notched areas (21) allowing detachment of segments (21) of the bar necessary to obtain the predetermined volume of the metal alloy, the segments being melted in the hollow mold (11) and brought to the melting temperature ($T_1$) by the at least one induction coil (31).

5. The device according to claim 1, wherein the machining mechanism comprises a rotating shaping tool (27) in communication with one or more mechanisms which cause the shaping tool (27) to rotate about an axis and a means for causing axial and lateral movement to bring the shaping tool (27) into contact with an interior face of the blank (26) to form an interior shape of the mechanical part.

6. The device according to claim 1, wherein the hollow mold (11) is combined with a mask (15) that forms a casting wall of the mechanical part.

7. The device according to claim 1, wherein the means for tempering the mechanical part (28) comprises at least a tempering bath.

8. The device according to claim 1, wherein the hollow mold (41) consists of at least two mobile segments (42) positioned to allow opening of the hollow mold to extract the mechanical part.

9. The device according to claim 1, wherein the hollow mold (11; 41) comprises a crucible (13) positioned to contain the predetermined volume of the metal alloy and a casting cavity (14) that communicates with the crucible (13).

10. The device according to claim 1, wherein the means for cooling the blank (26) are located to cool one or more of exterior walls of the mold (11; 41) and a mask (15).

11. The device according to claim 1, wherein the induction heating components comprise a vertical induction oven (23) open at a lower end above the hollow mold, which oven brings the predetermined volume of metal alloy to the melting temperature ($T_1$).

* * * * *